(12) United States Patent
Fujinawa (10) Patent No.: US 8,459,798 B2
(45) Date of Patent: Jun. 11, 2013

(54) ILLUMINATION APPARATUS AND PROJECTOR

(75) Inventor: Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 220 days.

(21) Appl. No.: 12/934,085

(22) PCT Filed: Dec. 19, 2008

(86) PCT No.: PCT/JP2008/073160
§ 371 (c)(1),
(2), (4) Date: Sep. 23, 2010

(87) PCT Pub. No.: WO2009/125523
PCT Pub. Date: Oct. 15, 2009

(65) Prior Publication Data
US 2011/0013146 A1    Jan. 20, 2011

(30) Foreign Application Priority Data
Apr. 7, 2008 (JP) .................................. 2008-098909

(51) Int. Cl.
*G03B 21/14* (2006.01)
(52) U.S. Cl.
USPC .................. 353/20; 353/33; 353/34; 353/77; 353/78; 353/99; 349/8; 349/9; 349/57; 359/618; 359/629
(58) Field of Classification Search
USPC ................ 353/33, 34, 37, 73, 77, 78, 98, 99, 353/20, 119, 122; 359/487.04, 489.08, 583, 359/629, 639; 349/5, 7, 8, 9, 57, 62; 362/19, 362/608, 609, 800, 341
See application file for complete search history.

(56) References Cited

U.S. PATENT DOCUMENTS
6,038,005 A * 3/2000 Handschy et al. ............ 349/61
6,693,749 B2 * 2/2004 King et al. .................... 359/630
(Continued)

FOREIGN PATENT DOCUMENTS
JP    5-313120 A    11/1993
JP    10-221640 A    8/1998
(Continued)

OTHER PUBLICATIONS

English translation of International Preliminary Report on Patentability issued Nov. 30, 2010, in International Patent Application No. PCT/JP2008/073160.

*Primary Examiner* — Georgia Y Epps
*Assistant Examiner* — Sultan Chowdhury
(74) *Attorney, Agent, or Firm* — Miles & Stockbridge P.C.

(57) ABSTRACT

An illumination apparatus includes a light source, a polarization splitter disposed facing the light source at about 45 degrees with respect to its light emission direction, a first reflector reflecting and condensing one of the polarization light components polarized and split by the polarization splitter, a quarter wave plate disposed between the polarization splitter and the first reflector, a second reflector reflecting and condensing the other of the polarization light components polarized and split by the polarization splitter, a third reflector disposed around the light source and reflecting the other polarization light reflected by the second reflector and the polarization splitter and proceeding in the light source direction, and a quarter wave plate disposed between the polarization splitter and the third reflector and around the light source, the light reflected at the first reflector and reflected at the polarization splitter being used to illuminate a predetermined surface.

8 Claims, 10 Drawing Sheets

U.S. PATENT DOCUMENTS

| | | | |
|---|---|---|---|
| 6,704,065 B1 * | 3/2004 | Sharp et al. | 349/5 |
| 7,119,957 B2 * | 10/2006 | Itoh et al. | 359/489.07 |
| 7,133,207 B2 * | 11/2006 | Travers | 359/630 |
| 7,357,511 B2 * | 4/2008 | Aastuen et al. | 353/20 |
| 7,537,352 B2 * | 5/2009 | Chen | 362/19 |
| 7,540,616 B2 * | 6/2009 | Conner | 353/20 |
| 7,616,381 B2 * | 11/2009 | Shen et al. | 359/629 |
| 8,152,317 B2 * | 4/2012 | Okamoto et al. | 362/19 |
| 2002/0191235 A1 * | 12/2002 | O'Connor et al. | 359/9 |
| 2003/0103171 A1 * | 6/2003 | Hall et al. | 349/5 |
| 2008/0055549 A1 * | 3/2008 | Perkins et al. | 353/20 |

FOREIGN PATENT DOCUMENTS

| | | |
|---|---|---|
| JP | 2005-250392 A | 9/2005 |
| JP | 2006-227361 A | 8/2006 |
| JP | 2007-279749 A | 10/2007 |

* cited by examiner

ILLUMINATION APPARATUS AND PROJECTOR

TECHNICAL FIELD

The present invention relates to an illumination apparatus and projector provided with a polarization conversion function.

BACKGROUND ART

A projector projecting a projection-use image displayed on a liquid crystal device is known in the art (for example, Japanese Patent Laid-open Publication No. 2005-250392A). In this projector, only a specific polarization component of light is used for projection of the projection-use image, so only half of the amount of light emitted from a light source can be utilized. Therefore, a projector using a polarization conversion device to align the light emitted from a light source in polarization direction with a certain polarization direction and thereby increase the amount of light able to be used for projection by the projector has been proposed (for example, Japanese Patent Laid-open Publication No. 2006-227361A).

SUMMARY OF INVENTION

However, in the above-mentioned projector, when aligning the polarization directions, a polarization conversion device is used, so there was the problem of the apparatus becoming larger in size.

An object of the present invention is to provide an illumination apparatus and projector providing a small sized, compact polarization conversion function and enabling light emitted from a light source to be efficiently utilized.

The illumination apparatus of the present invention is comprised of a light source, a polarization splitter disposed facing the light source at about 45 degrees with respect to its light emission direction, a first reflector reflecting and condensing one of the polarization light components polarized and split by the polarization splitter, a quarter wave plate disposed between the polarization splitter and the first reflector, a second reflector reflecting and condensing the other of the polarization light components polarized and split by the polarization splitter, a third reflector disposed around the light source and reflecting the other polarization light reflected by the second reflector and the polarization splitter and proceeding in the light source direction, and a quarter wave plate disposed between the polarization splitter and the third reflector and around the light source, the light reflected at the first reflector and reflected at the polarization splitter being used to illuminate a predetermined surface.

Further, the projector of the present invention is comprised of a light source, a display displaying a projection-use image, a polarization splitter disposed facing the light source at about 45 degrees with respect to its light emission direction, a first reflector reflecting and condensing one of the polarization light components polarized and split by the polarization splitter, a quarter wave plate disposed between the polarization splitter and the first reflector, a second reflector reflecting and condensing the other of the polarization light components polarized and split by the polarization splitter, a third reflector disposed around the light source and reflecting the other polarization light reflected by the second reflector and the polarization splitter and proceeding in the light source direction, and a quarter wave plate disposed between the polarization splitter and the third reflector and around the light source, the light reflected at the first reflector and reflected at the polarization splitter being used to illuminate the display.

According to the illumination apparatus and projector of the present invention, a small in size and compact polarization conversion function is provided, so light emitted from the light source can be efficiently utilized.

DESCRIPTION OF EMBODIMENTS

Figure 1:
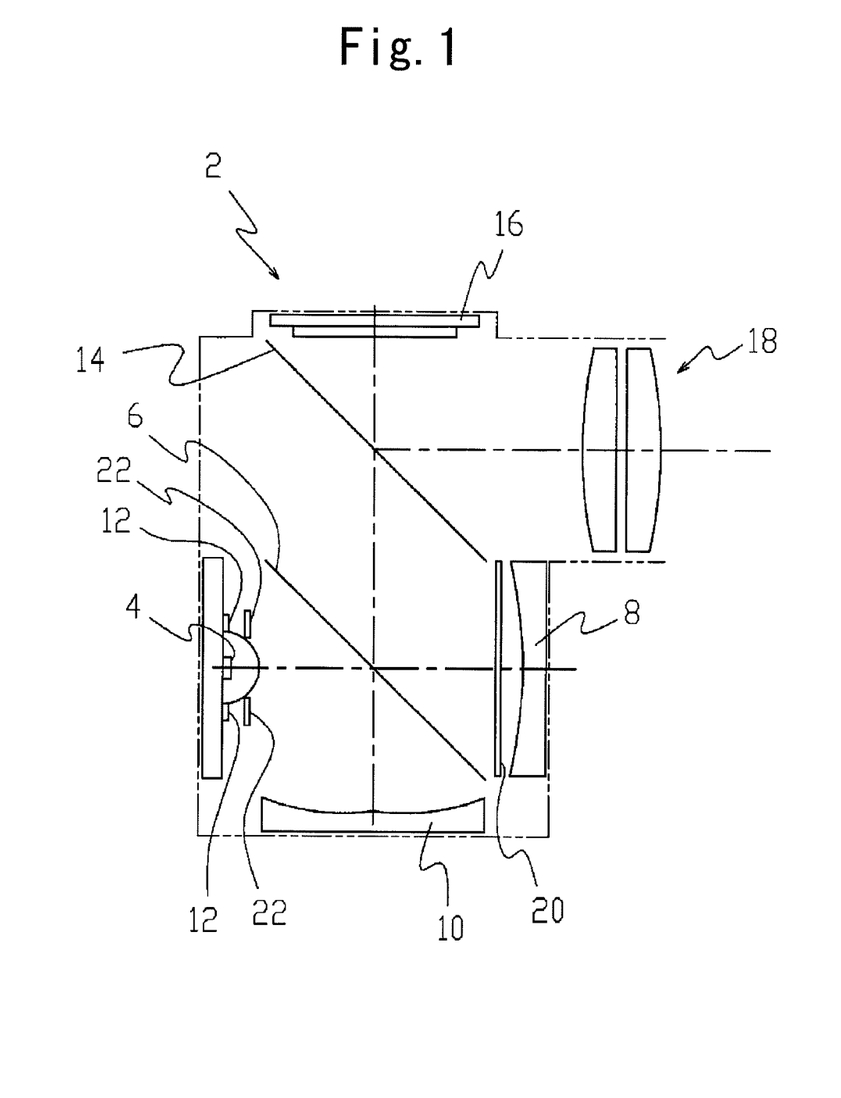
FIG. 1 is a view showing the configuration of a projector according to a first embodiment of the present invention.

Below, referring to the drawings, a projector according to a first embodiment of the present invention will be explained. FIG. 1 is a view showing the configuration of a projector according to a first embodiment of the present invention. A projector 2 is provided with a light source comprised of an LED (light emitting diode) 4, a wire grid 6 disposed facing the LED 4 at about 45 degrees with respect to its light emission direction, passing a P polarization component of light, and reflecting an S polarization component of light so as to split the striking light into the P polarization component of light and the S polarization component of light, a mirror 8 having a concave shaped reflecting surface and reflecting and condensing the P polarization component of light split by the wire grid, a mirror 10 having a circumferential shaped concave shape and reflecting and condensing the S polarization component of light split by the wire grid, and a mirror 12 disposed around the light source and having a circumferential shape. Further, between the wire grid 6 and mirror 8, a quarter wave plate 20 is provided, while between the wire grid 6 and mirror 12 and around the LED 4, a quarter wave plate 22 having a circumferential shape is provided. Furthermore, a wire grid 14 disposed facing the wire grid 6 at about 45 degrees with respect to the direction of progression of the reflected light, passing the S polarization component of light, and reflecting the P polarization component of light, a LCOS (reflection type liquid crystal device) 16 displaying a projection-use image, and a projection lens 18 projecting the projection-use image are provided.

Figure 2:
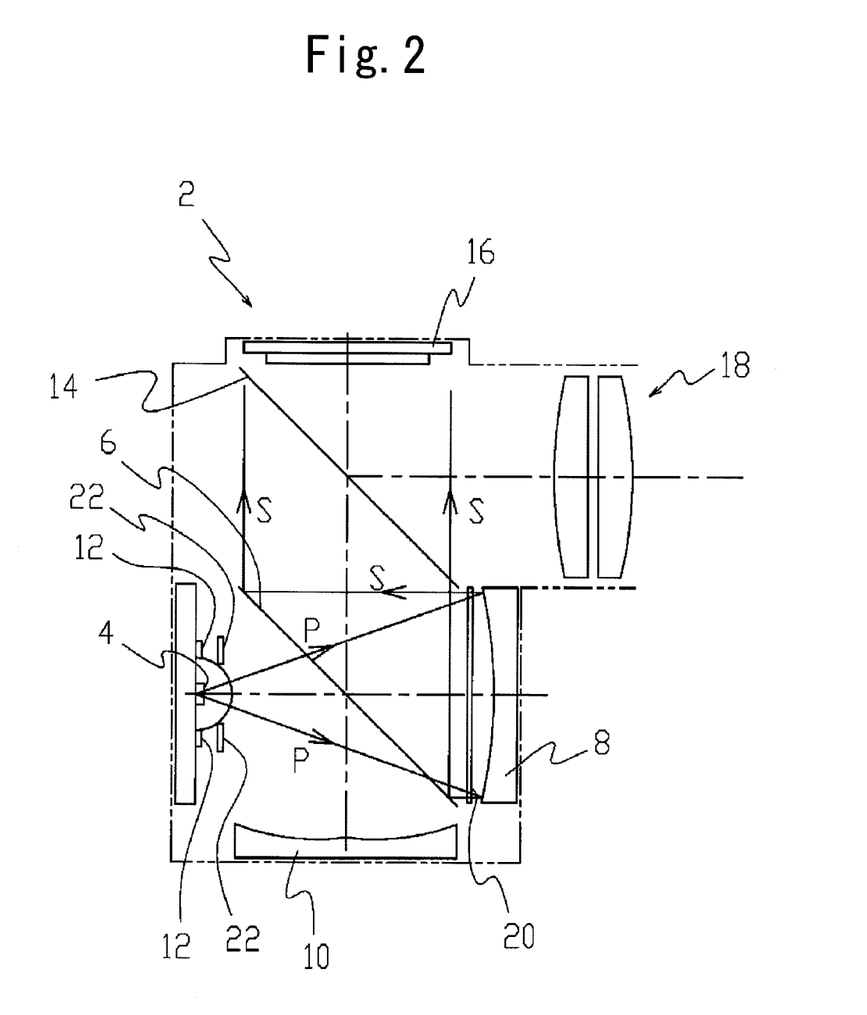
FIG. 2 is a view showing a light path in a projector according to a first embodiment of the present invention.

Next, referring to FIG. 2 to FIG. 5, the path of the light emitted from the LED according to the first embodiment will be explained. The light emitted from the LED 4 strikes the wire grid 6 and is split into the P polarization component of light and the S polarization component of light. As shown in FIG. 2, the P polarization component of light passes through the wire grid 6 and proceeds in the mirror 8 direction. The P polarization component of light passing through the wire grid 6 passes through the quarter wave plate 20 and is reflected and condensed at the mirror 8 to become substantially parallel light which again passes through the quarter wave plate 20 to thereby be converted to the S polarization component of light. The S polarization component of light again strikes the wire grid 6, is reflected by the wire grid 6, passes through the wire grid 14, and illuminates the LCOS 16.

Figure 3:
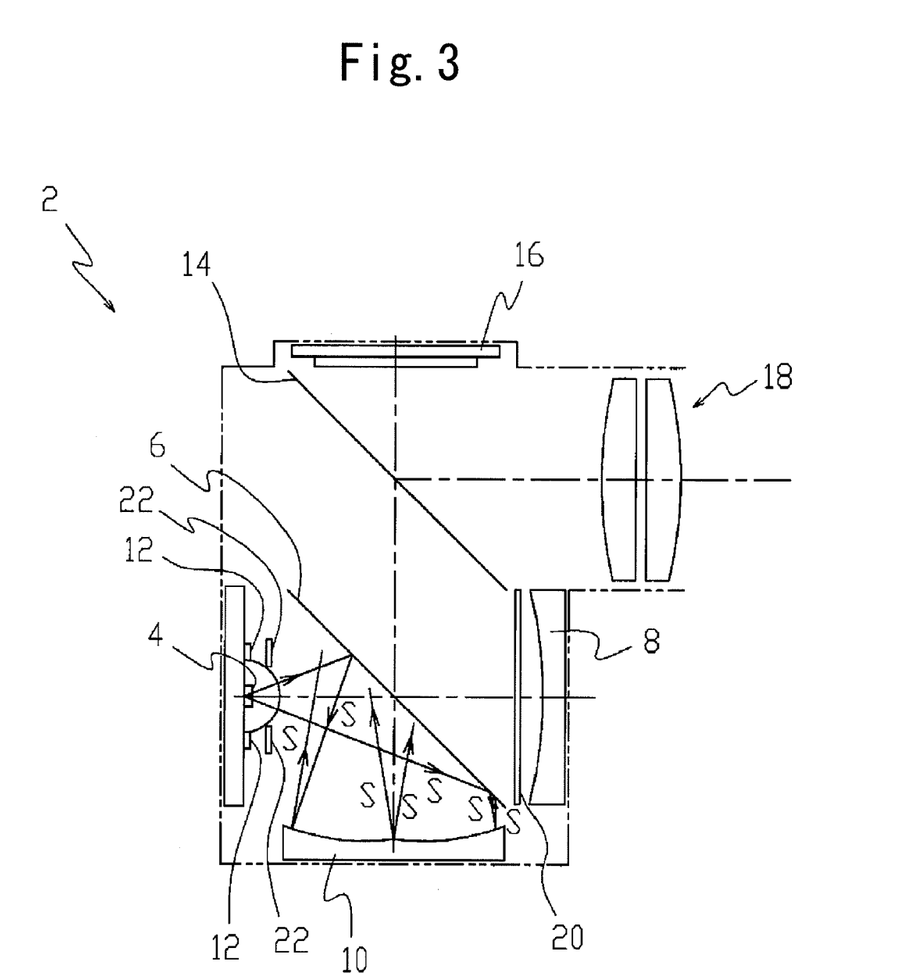
FIG. 3 is a view showing a light path in a projector according to a first embodiment of the present invention.

Further, in the light emitted from the LED 4 and striking the wire grid 6, the S polarization component of light, as shown in FIG. 3, is reflected by the wire grid 6, proceeds toward the mirror 10, and strikes the mirror 10. In the S polarization component of light striking the mirror 10, since the mirror 10 has a circumferential concave shape, the light striking near the center of the mirror 10 is reflected outward. Therefore, the cross-section of the S-polarization light reflected by the mirror 10 is a circular or elliptical shape with the center portion missing, that is, a ring shape. The light proceeds in the wire grid 6 direction, is reflected at the wire grid 6, and proceeds in the LED 4 direction.

Figure 4:
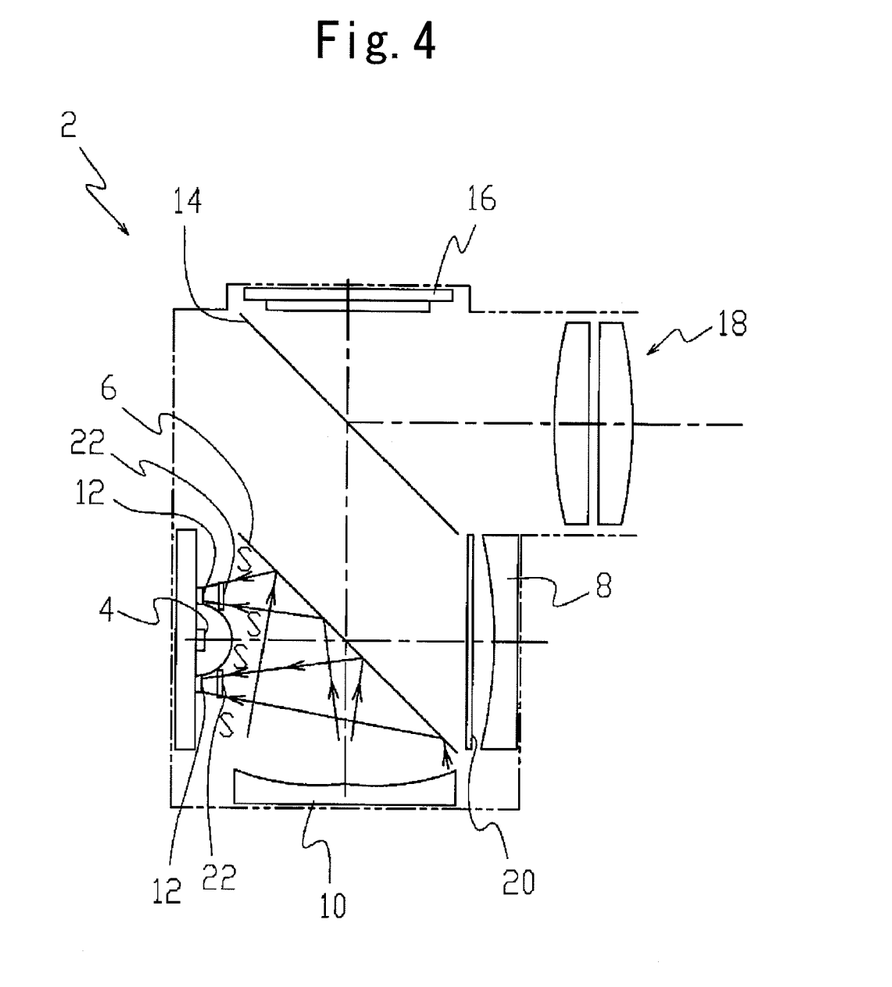
FIG. 4 is a view showing a light path in a projector according to a first embodiment of the present invention.
Figure 5:
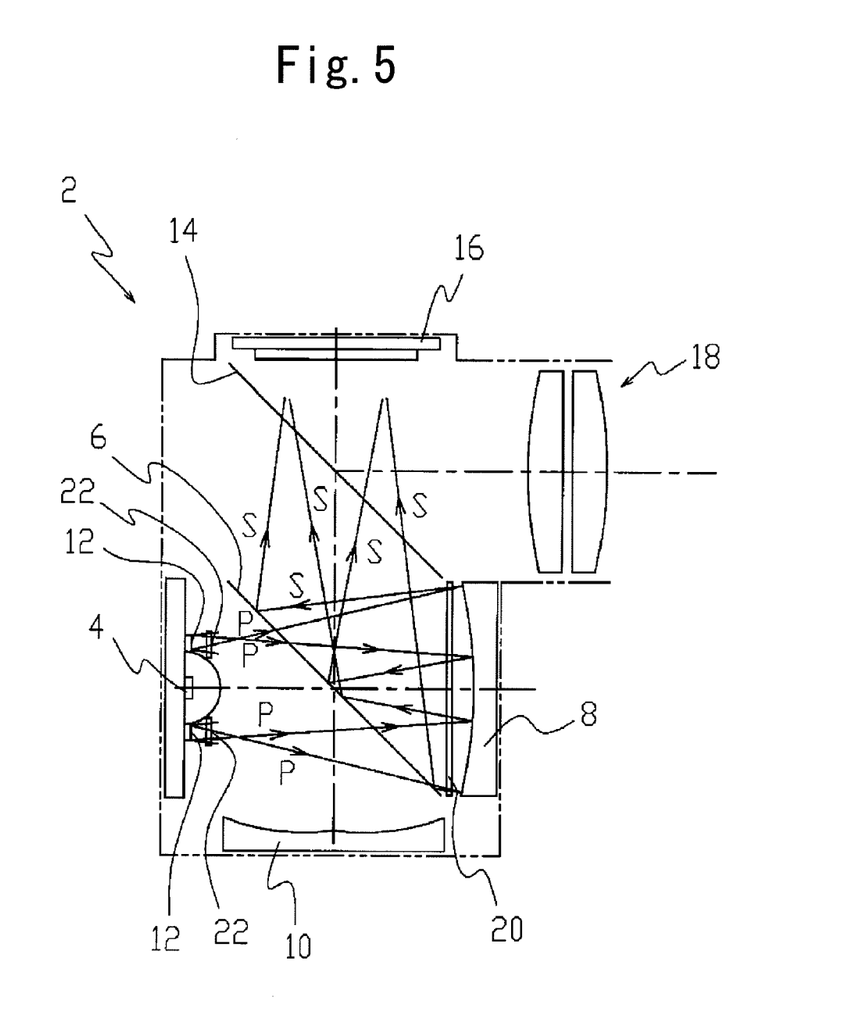
FIG. 5 is a view showing a light path in a projector according to a first embodiment of the present invention.

The S polarization component of light reflected at the wire grid 6 and proceeding in the LED 4 direction, as shown in FIG. 4, passes through the quarter wave plate 22 having the circumferential shape, is reflected at the mirror 12 having the circumferential shape, and, as shown in FIG. 5, again passes through the quarter wave plate 22 to thereby be converted to the P polarization component of light. At this time, the mirror 12 is formed so as to be slanted in the peripheral edge direction so that the reflected light strikes the outer circumference of the mirror 8. Therefore, as shown in FIG. 5, the light reflected by the mirror 12 is emitted somewhat outward. The light reflected by the mirror 12 and converted to the P polarization component of light passes through the wire grid 6 and proceeds in the mirror 8 direction. The P polarization component of light passing through the wire grid 6 passes through the quarter wave plate 20, is reflected and condensed at the mirror 8, again passes through the quarter wave plate 20, and thereby is converted to the S polarization component of light. The light converted to the S polarization component of light again strikes the wire grid 6, is reflected by the wire grid 6, passes through the wire grid 14, and illuminates the LCOS 16.

That is, the light emitted from the LED 4 is split by the wire grid 6 into the P polarization component and the S polarization component, but both the P polarization component and S polarization component strike the LCOS 16 as the S polarization component of light.

The S polarization component of light striking the LCOS 16 proceeds through the liquid crystal layer of the LCOS 16, is reflected at a not shown reflection film, then proceeds through the liquid crystal layer of the LCOS 16 in the opposite direction and is emitted from the LCOS 16. The light emitted from the LCOS 16 again strikes the wire grid 14. When voltage is applied to the liquid crystal layer of the LCOS 16, the LCOS functions as a phase plate and converts the S polarization component of light to the P polarization component of light. Therefore, the light again striking the wire grid 14 becomes the mixed S polarization component of light and P polarization component. The wire grid 14 reflects, in the again striking light, only the P polarization component of light. The reflected P polarization component of light strikes the projection lens 18. Therefore, the projection-use image is projected through the projection lens 18 on to a not shown screen.

According to the projector of the present embodiment, it is possible to effectively utilize the light emitted from the light source for projection of a projection-use image.

Note that even if configuring the wire grid 6 to reflect the P polarization component of light and pass the S polarization component of light and configuring the wire grid 14 to reflect the S polarization component of light and pass the P polarization component of light, a similar function can be exhibited. In this case, the light path of the P polarization component in above-mentioned first embodiment becomes the light part of the S polarization component and the light path of the S polarization component becomes the light path of the P polarization component.

Next, a projector according to a second embodiment of the present invention will be explained. Note that, the configuration of the projector according to this second embodiment changes the layout of the mirrors of the projector according to the first embodiment. Therefore, a detailed explanation of the same configurations as the first embodiment will be omitted and only the different parts will be explained in detail. Further, parts of the configuration the same as in the first embodiment will be explained assigned the same reference numerals.

Figure 6:
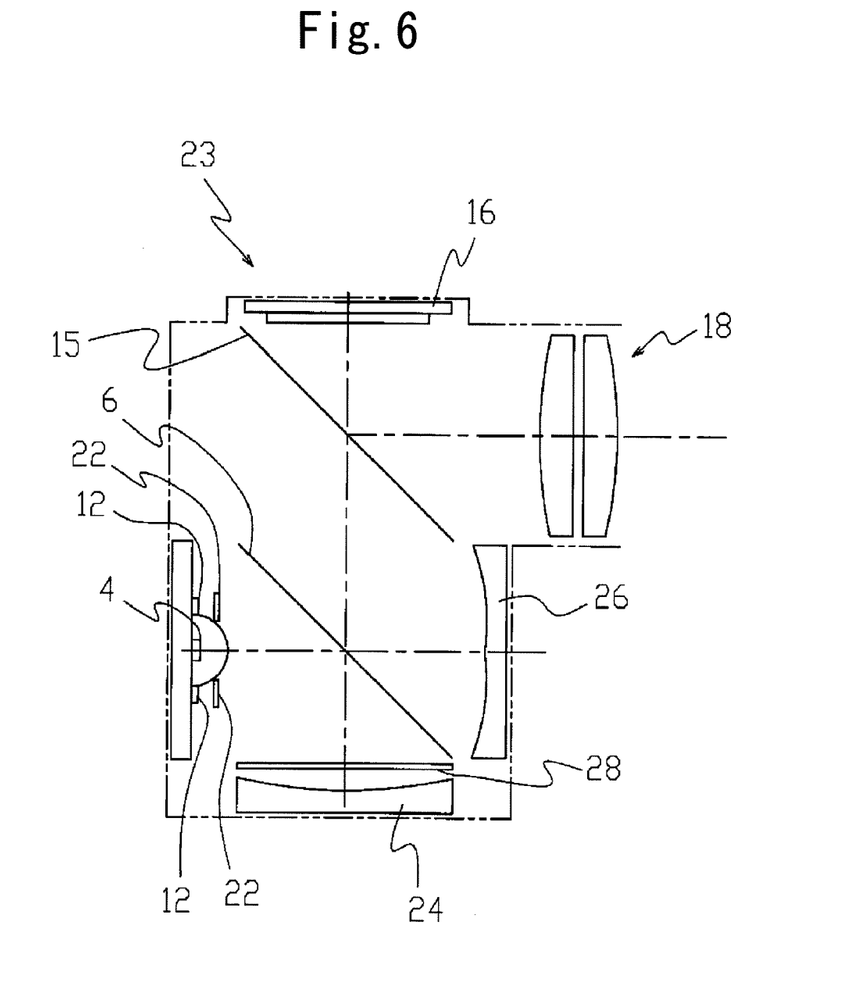
FIG. 6 is a view showing the configuration of a projector according to a second embodiment of the present invention.

FIG. 6 is a view showing the configuration of a projector according to a second embodiment of the present invention. A projector 23 is comprised of an LED 4 as a light source, a wire grid 6 arranged facing the LED 4 at about 45 degrees with respect to its light emission direction, reflecting the S polarization component of light, and passing the P polarization component of light, a mirror 24 having a concave shaped reflecting surface and reflecting and condensing the S polarization component of light split by the wire grid, a mirror 26 having a circumferential shaped concave shape and reflecting and condensing the P polarization component of light split by the wire grid, and a mirror 12 arranged around the light source and having a circumferential shape. Further, between the wire grid 6 and mirror 24, a quarter wave plate 28 is provided, while between the wire grid 6 and mirror 12 and around the LED 4, a quarter wave plate 22 having a circumferential shape is provided. Furthermore, a wire grid 15 arranged facing the wire grid 6 at about 45 degrees with respect to the direction of progression of the reflected light, reflecting the S polarization component of light, and passing the P polarization component of light, a LCOS (reflection type liquid crystal device) 16 displaying a projection-use image, and a projection lens 18 projecting the projection-use image are provided.

Figure 7:
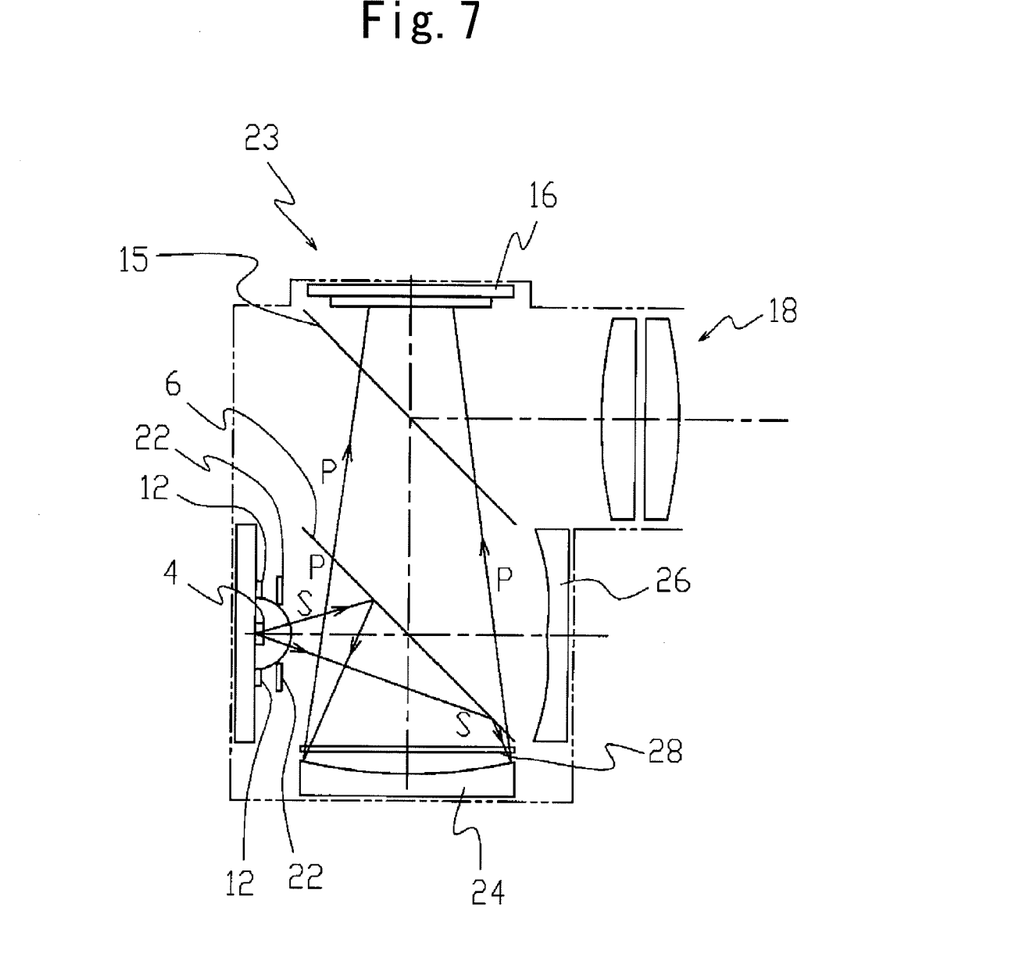
FIG. 7 is a view showing a light path in a projector according to a second embodiment of the present invention.

Next, referring to FIG. 7 to FIG. 9, the path of the light emitted from the LED according to the second embodiment will be explained. The light emitted from the LED 4 strikes the wire grid 6 and is split into the P polarization component of light and the S polarization component of light. In the light striking the wire grid 6, the S polarization component of light, as shown in FIG. 7, is reflected at the wire grid 6, proceeds toward the mirror 24, passes through the quarter wave plate 28, is reflected and condensed at the mirror 24 to become substantially parallel light, again passes through the quarter wave plate 28, and thereby is converted to the P polarization component of light. The light converted to the P polarization component of light again strikes the wire grid 6 to pass through the wire grid 6. Further, it passes through the wire grid 15 and illuminates the LCOS 16.

Figure 8:
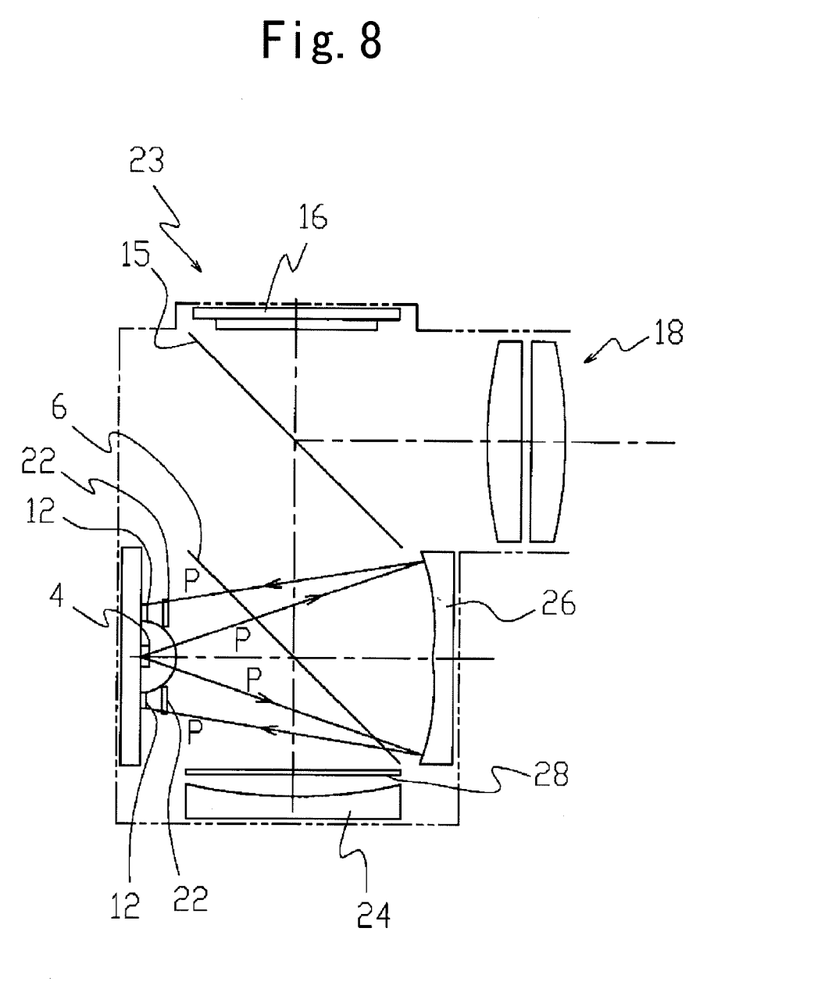
FIG. 8 is a view showing a light path in a projector according to a second embodiment of the present invention.
Figure 9:
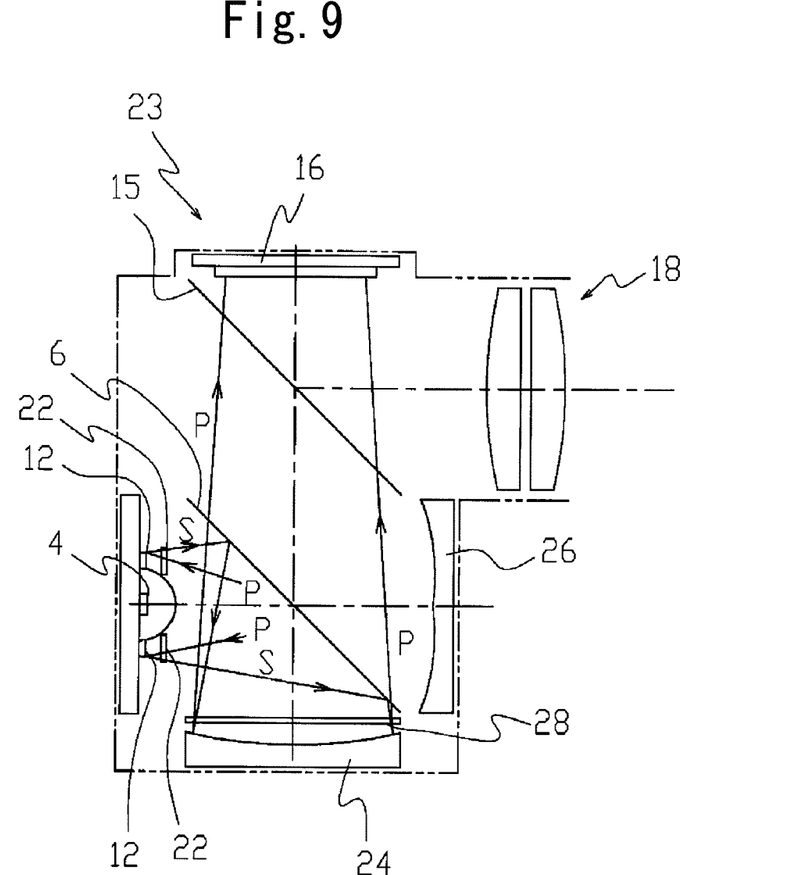
FIG. 9 is a view showing a light path in a projector according to a second embodiment of the present invention.

Further, in the light emitted from the LED 4 and striking the wire grid 6, the P polarization component of light passes through the wire grid 6 and, as shown in FIG. 8, proceeds toward the mirror 26 and strikes the mirror 26. In the P polarization component of light striking the mirror 26, since the mirror 26 has a circumferential shaped concave shape, the light striking near the center of the mirror 26 is reflected outward. Therefore, the cross-section of the P-polarization light reflected by the mirror 26 is a circular or elliptical shape with the center portion missing, that is, a ring shape. The light proceeds in the wire grid 6 direction, is reflected at the wire grid 6, and proceeds in the LED 4 direction.

The P polarization component of light passing through the wire grid 6 and proceeding in the LED 4 direction, as shown in FIG. 9, passes through the quarter wave plate 22 having the circumferential shape to be reflected by the mirror 12 having the circumferential shape and, as shown in FIG. 9, again passes through the quarter wave plate 22, so is converted to the S polarization component of light. At this time, the mirror 12 is formed to slant in the peripheral edge direction so that the reflected light strikes the outer circumference of the mirror 24. Therefore, as shown in FIG. 9, the light reflected by the mirror 12 is emitted somewhat outward. The light reflected by the mirror 12 and converted to the S polarization component of light is reflected at the wire grid 6 and proceeds in the mirror 24 direction. The S polarization component of light reflected at the wire grid 6 passes through the quarter wave plate 28, is reflected and condensed at the mirror 24, again passes through the quarter wave plate 28, and thereby is converted to the P polarization component of light. The light converted to the P polarization component of light again strikes the wire grid 6 and passes through the wire grid 6. Further, it passes through the wire grid 15 and illuminates the LCOS 16.

That is, the light emitted from the LED 4 is split by the wire grid 6 into the P polarization component and the S polarization component. Both the P polarization component and S polarization component strike the LCOS 16 as the P polarization component of light.

The P polarization component of light striking the LCOS 16 proceeds through the liquid crystal layer of the LCOS 16, is reflected by a not shown reflection film, then proceeds through the liquid crystal layer of the LCOS 16 in the opposite direction and is emitted from the LCOS 16. The light emitted from the LCOS 16 again strikes the wire grid 15. When voltage is applied to the liquid crystal layer of the LCOS 16, the LCOS functions as a phase plate and converts the P polarization component of light to the S polarization component of light. Therefore, the light again striking the wire grid 15 becomes a mix of the S polarization component and P polarization component. The wire grid 15 reflects, in the again striking light, only the S polarization component of light at the polarization splitter. The reflected S polarization component of light strikes the projection lens 18. Therefore, the projection-use image is projected through a projection lens 18 on to a not shown screen.

According to the projector of the second embodiment, even when changing the layout of the mirrors, the projector can function in the same way as the first embodiment and efficiently utilize light emitted from a light source for projecting a projection-use image.

Note that, in the second embodiment, the wire grid 6 and the wire grid 15 were both explained using ones which reflect the S polarization component of light and pass the P polarization component of light, but even if configuring both the wire grid 6 and the wire grid 15 to reflect the P polarization component of light and pass the S polarization component of light, a similar function can be exhibited. In this case, the light path of the P polarization component in the above-mentioned second embodiment becomes the light path of the S polarization component and the light path of the S polarization component becomes the light path of the P polarization component.

Figure 10:
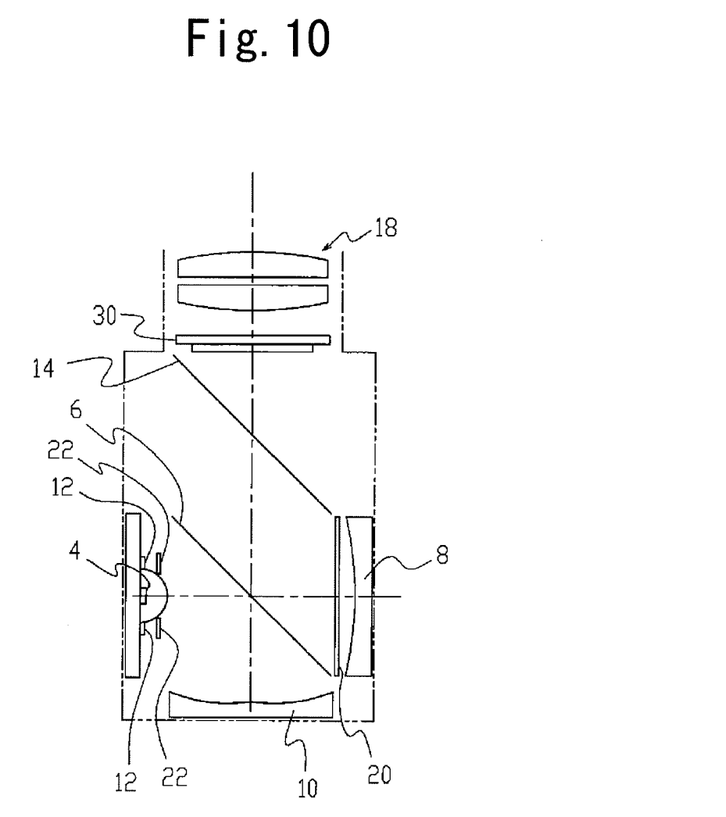
FIG. 10 is a view showing a modification of a projector unit according to an embodiment of the present invention.

Further, as shown in FIG. 10, instead of the reflection type liquid crystal device, a transmission type liquid crystal device 30 may also be used. Further, it is also possible not to use a mirror having a circumferential shaped concave shape. In this case, light reflected without being reflected in a ring shape will also strike the LED 4. The light reflected at the mirror 12 at the outer circumference of the LED 4 can increase the amount of light illuminating the LCOS 16. Further, instead of the wire grid, it is also possible to use a polarization beam splitter superior in angle characteristics.

Note that, this disclosure relates to the content contained in Japanese Patent Application No. 2007-296640 filed on Apr. 7, 2008, the entire disclosure of which is clearly incorporated by reference here.

{INDUSTRIAL APPLICABILITY}

The present invention can be utilized for an illumination apparatus and projector provided with a polarization conversion function.

The invention claimed is:

1. An illumination apparatus comprising:
a light source,
a polarization splitter disposed facing the light source at about 45 degrees with respect to its light emission direction,
a first reflector reflecting and condensing one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflected by the second reflector and the polarization splitter, proceeding in the light source direction, and
a second quarter wave plate disposed between the polarization splitter and the third reflector and around the light source,
the light reflected at the first reflector and reflected at the polarization splitter being used to illuminate a predetermined surface.

2. An illumination apparatus comprising:
a light source,
a polarization splitter disposed facing the light source at about 45 degrees with respect to its light emission direction,
a first reflector reflecting and condescending one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflected by the second reflector and the polarization splitter, proceeding in the light source direction, and
a second quarter wave plate disposed between the polarization splitter and the third reflector and around the light source,
the light reflected at the first reflector and reflected at the polarization splitter being used to illuminate a predetermined surface,
wherein the second reflector is formed so that light striking the second reflector is reflected as light having a ring-shaped cross-section.

3. An illumination apparatus comprising:
a light source,
a polarization splitter disposed facing the light source at about 45 degrees with respect to its light emission direction,
a first reflector reflecting and condensing one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflected by the second reflector and the polarization splitter proceeding in the light source direction, and
a second quarter wave plate disposed between the polarization splitter and the third reflector and around the light source,
the light reflected at the first reflector and reflected at the polarization splitter being used to illuminate a predetermined surface,
wherein the third reflector is formed so that light striking and reflected at the third reflector strikes an outer circumference of the first reflector.

4. A projector comprising:
a light source,
a display displaying a projection-use image,
a polarization splitter disposed facing the light source at about 45 degrees with respect to its light emission direction,
a first reflector reflecting and condensing one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflected by the second reflector and the polarization splitter, proceeding in the light source direction, and
a second quarter wave plate disposed between the polarization splitter and the third reflector and around the light source,
the light reflected at the first reflector and reflected at the polarization splitter being used to illuminate the display.

5. A projector comprising:
a light source,
a display displaying a projection-use image,
a polarization splitter disposed facing the light source at about 45 degrees with respect to its light emission direction,
a first reflector reflecting and condensing one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflecting by the second reflector and the polarization splitter, proceeding in the light source direction, and
a second quarter wave plate disposed between the polarization splitter and the third reflector and around the light source,
the light reflected at the first reflector and reflected at the polarization splitter being used to illuminate the display,
wherein the second reflector is formed so that light striking the second reflector is reflected as light having a ring-shaped cross-section.

6. A projector comprising:
a light source,
a display displaying a projection-use image,
a polarization splitter disposed facing the light source at about 45 degrees with respect to its light emission direction,
a first reflector reflecting and condensing one of the polarization light components polarized and split by the polarization splitter,
a first quarter wave plate disposed between the polarization splitter and the first reflector,
a second reflector reflecting and condensing the other of the polarization light components polarized and split by the polarization splitter,
a third reflector disposed around the light source and reflecting the other polarization light reflecting by the second reflector and the polarization splitter, proceeding in the light source direction, and
a second quarter wave plate disposed between the polarization splitter and the third reflector and around the light source,
the light reflected at the first reflector and reflected at the polarization splitter being used to illuminate the display,
wherein the third reflector is formed so that light striking and reflected at the third reflector strikes an outer circumference of the first reflector.

7. The illumination apparatus according to claim 2, wherein the third reflector is formed so that light striking and reflected at the third reflector strikes an outer circumference of the first reflector.

8. The projector according to claim 5, wherein the third reflector is formed so that light striking and reflected at the third reflector strikes an outer circumference of the first reflector.

* * * * *